United States Patent [19]

Kamiya

[11] Patent Number: 4,701,796
[45] Date of Patent: Oct. 20, 1987

[54] SYNCHRONIZATION SIGNAL GENERATING CIRCUIT

[75] Inventor: Kiyoshi Kamiya, Tokorozawa, Japan

[73] Assignee: Citizen Watch Co., Ltd., Tokyo, Japan

[21] Appl. No.: 673,956

[22] Filed: Nov. 21, 1984

[30] Foreign Application Priority Data

Nov. 24, 1983 [JP] Japan ................ 58-221208

[51] Int. Cl.⁴ ........................... H04N 5/10
[52] U.S. Cl. ................... 358/154; 358/153
[58] Field of Search ........... 358/154, 153, 148, 150, 358/158, 149, 336, 339, 319, 320; 328/139

[56] References Cited

U.S. PATENT DOCUMENTS

| 3,755,624 | 8/1973 | Sekimoto | 358/148 |
| 4,159,481 | 6/1979 | Mikado | 358/153 |
| 4,418,364 | 11/1983 | Wine | 358/336 |
| 4,420,775 | 12/1983 | Yamazaki | 358/148 |
| 4,556,905 | 12/1985 | Ikejiri | 358/154 |

Primary Examiner—Tommy P. Chin
Assistant Examiner—David E. Harvey
Attorney, Agent, or Firm—Jordan and Hamburg

[57] ABSTRACT

A circuit for generating vertical and horizontal sync signals suitable for a display which is driven by digital signals, e.g. a liquid crystal display panel of a television receiver, whereby purely digital circuit elements can be utilized throughout, as opposed to conventional sync signal generating circuits which are basically of analog type. Recognition of sync signal components derived from a composite video signal is based on time discrimination using counters and gate circuits, and the circuits can be substantially entirely implemented within a single low power-consumption integrated circuit, e.g. a CMOS IC.

1 Claim, 24 Drawing Figures

SYNCHRONIZATION SIGNAL GENERATING CIRCUIT

BACKGROUND OF THE INVENTION

In recent years, there has been an increasing trend towards the replacement of conventional CRT raster-scanning displays by new types of display device, such as liquid crystal display panels, which offer the advantages of compactness, flatness, light weight, low power consumption, etc. One of the features which differentiates such new types of display device from CRT types of display lies in the manner in which drive signals are applied to produce scanning of the display, since the new display devices are driven by purely digital timing signals, rather than the analog form of drive signal applied to drive a CRT display (e.g. to produce scanning in the vertical direction). There is therefore a requirement to implement all of the circuits associated with such a flat-panel type of display device by utilizing only circuit elements producing digital signals, for example in order to enable all or most of the peripheral circuits to be formed within a single IC chip. This has the advantage of enabling power consumption to be minimized as well as reducing manufacturing costs and enabling overall size reduction.

It is possible to utilize circuits for deriving the horizontal and vertical synchronization signals (referred to in the following as horizontal and vertical sync signals) for a driving a liquid crystal display panel which are similar to those employed hitherto for CRT television displays. These sync signal generating circuits are of basically analog type, and require the use of components (e.g. relatively large-value capacitor used in an integrator circuit for separating the horizontal and vertical sync signal components) which cannot be formed within an IC chip, and so must be provided external to the IC. In addition, such circuits may consume a substantially high level of power.

With prior art sync signal generating circuits which have been of digital type, for use in television receivers, logical processing is generally performed on the output signal from an oscillator at a frequency of approximately 15.75 KHz (e.g. whose period is equal to the horizontal scanning period of a television display, designated in the following as H). Such digital types of circuit have also been used for CRT display scanning. However since a very stable frequency of oscillation is required if the signals are to be used for horizontal scanning of a CRT display, an AFC circuit will generally be incorporated to control that frequency. Thus. the circuit configuration becomes complex.

ln addition, if interlace scanning is to be performed (i.e. for a CRT display in accordance with NTSC standards), it will be necessary to provide a different sync signal generating circuit from that used with a non-interlace scanning display, such as that of a computer. That is, in the prior art, it has not easy possible to provide a digital type of sync signal generating circuit which will be compatible with both interlace and non-interlace scanning.

There is therefore a requirement for a synchronization signal generating circuit which is of essentially digital type, i.e. can be formed substantially entirely of digital circuit elements which can be formed within a common IC chip, which will have low power consumption, will be suitable for scanning of both CRT and flat-panel (e.g. liquid crystal display panel) displays, and preferably will be suitable for both interlace and non-interlace scanning applications.

SUMMARY OF THE DISCLOSURE

A synchronization signal generating circuit according to the present invention is based on a pattern matching circuit which is coupled to receive a sync separation signal (i.e. a signal derived from a composite video signal, which contains only the vertical and horizontal sync signal components of that composite video signal). The pattern matching circuit acts to recognize the vertical and horizontal sync pulse components of the sync separation signal, and to generate a pulse or pulses (referred to in the following as a vertical pattern detection pulse) each time a vertical sync pulse component is recognized, and to generate a single pulse (referred to in the following as a horizontal pattern detection pulse) each time a horizontal sync pulse component is recognized, and to generate a vertical pattern detection pulse each time a vertical sync pulse component is recognized.

The synchronization signal generating circuit further comprises a vertical time gate circuit, a vertical sync signal generating circuit, a horizontal time gate circuit and a horizontal sync signal generating circuit. The vertical pattern detection pulses are input to the vertical time gate circuit, which can be set in an open state, in which a reset pulse is output therefrom in response to input of a vertical pattern detection pulse, and which becomes closed (inhibiting output of further reset pulses in response to input pulses thereto) after a reset pulse has been output therefrom. The latter reset pulses are input to the vertical sync signal generating circuit. The vertical sync signal generating circuit contains a counter circuit, which is coupled to count pulses of a relatively high frequency clock signal, and which is reset to an initial count value (e.g. zero) each time a vertical pattern detection pulse is input to the vertical sync signal generating circuit from the vertical time gate circuit. When such a reset has occurred, the counter circuit begins to count the clock signal pulses, and when a predetermined count value is reached (after a time interval equal to the vertical sync period has elapsed), the vertical sync signal generating circuit acts to generate a vertical sync signal pulse, e.g. by synthesizing such a pulse from output signals produced by the counter circuit. After a fixed time interval has elapsed following input of a reset pulse to the vertical sync signal generating circuit, this time interval being slightly less than the vertical sync signal period, a clear pulse is output by the vertical sync signal generating circuit which acts to open the vertical time gate circuit, to enable transfer of the next vertical pattern detection pulse therethrough to again reset the counter circuit in the vertical sync signal generating circuit, for generation of the next vertical sync signal pulse therefrom. However, if the latter vertical pattern detection pulse fails to be produced at the requisite time, e.g. due to signal drop-out, then self-reset of the counter circuit in the vertical sync signal generating circuit is automatically performed, to thereby produce a vertical sync signal pulse at a timing which is very close to the timing which would have resulted if drop-out had not occurred. Thereafter, self-reset of the counter circuit in the vertical sync signal generating circuit will take place repetitively, with a period which is precisely identical to the vertical sync signal period, with the vertical time gate circuit being left in the open state until a vertical pattern detection pulse is once more input to the vertical time gate circuit. Synchronized generation of the vertical sync signal pulses as described above then resumes.

The operation of the horizontal time gate circuit and the horizontal sync signal generating circuit, whereby horizontal sync signal pulses are generated in synchronism with the horizontal sync pulse component of the sync separation signal during normal operation and whereby accurately time horizontal sync signal pulses continue to be generated during intervals in which drop-out of the sync separation signal occurs, is essentially identical to that of the vertical time gate circuit and vertical sync signal generating circuit described above.

BRIEF DESCRIPTION OF THE DRAWINGS

FIG. 3(a)–3(e) are timing charts to illustrate the operation of the embodiment of FIG. 2;

FIG. 8(a) to 8(k) are timing charts for illustrating the operation of the embodiment of FIG. 7;

DESCRIPTION OF THE PREFERRED EMBODIMENTS

Figure 1:
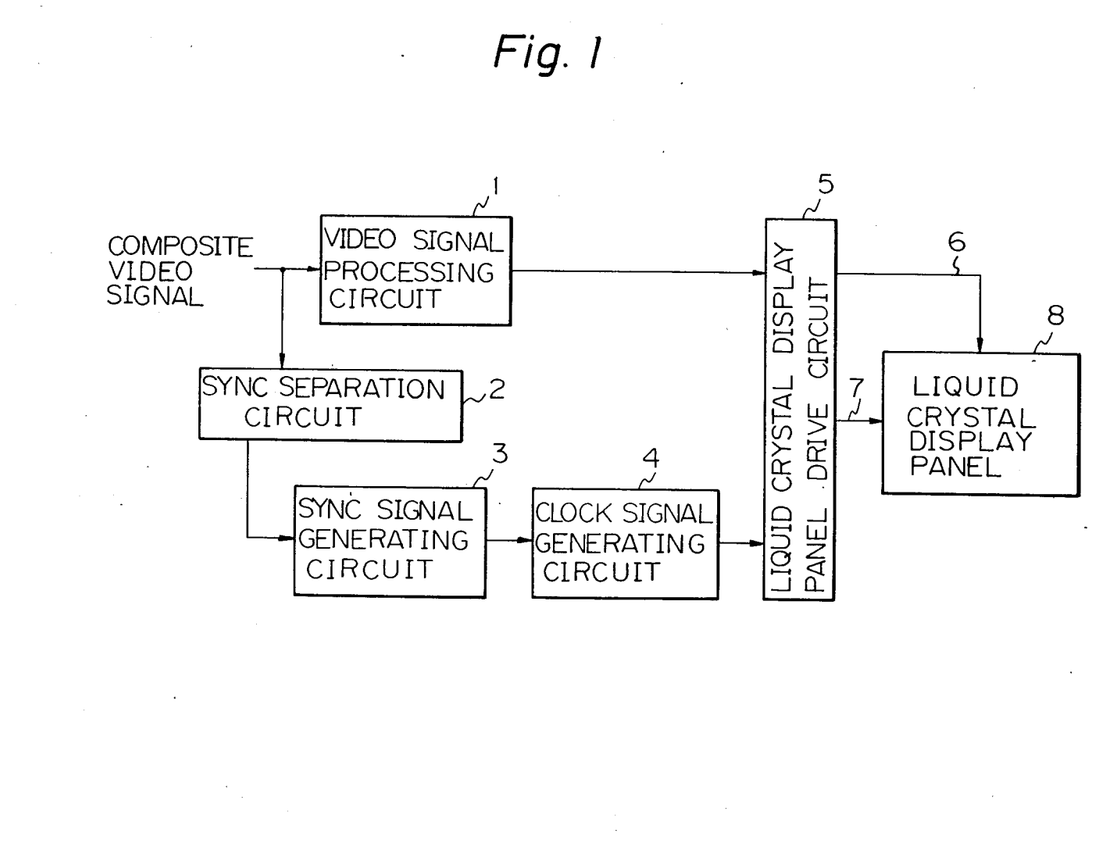
FIG. 1 is a general block circuit diagram of the display section of a liquid crystal display panel television receiver which incorporates a synchronization signal generating circuit according to the present invention.

Referring first to FIG. 1, a general block circuit diagram is shown of an embodiment of a liquid crystal display panel television receiver which incorporates a synchronization signal generating circuit according to the present invention. In FIG. 1, numeral 1 denotes a video signal processing circuit, which receives a composite video signal and performs analog-to-digital conversion of the brightness component of that signal, to produce digital output signals which are applied through a drive circuit 5 to drive a liquid crystal display panel 8. The composite video signal is also input to a sync separation circuit 2, which produces as output a sync separation signal containing only the vertical and horizontal sync signal components of the composite video signal. The sync separation signal is input to a synchronization signal generating circuit according to the present invention, which performs processing thereon such as to produce vertical sync signal pulses and horizontal sync signal pulses which are input to a clock signal generating circuit 4. The clock signal generating circuit 4 produces various digital timing signals, synchronized with the vertical sync signal pulses and horizontal sync signal pulses, which are applied through liquid crystal display panel drive circuit 5 to the scanning electrodes of liquid crystal display panel 8 such as to produce scanning of the display in correct synchronism with the brightness drive signals applied to the signal electrodes of liquid crystal display panel 8 from drive circuit 5.

Since the output signals from sync separation circuit 2 are in digital form, as are the output signals from clock signal generating circuit 4, it is desirable that synchronization signal generating circuit operate entirely by digital signal operation. This is made possible by the present invention, as described in the following.

Figure 2:
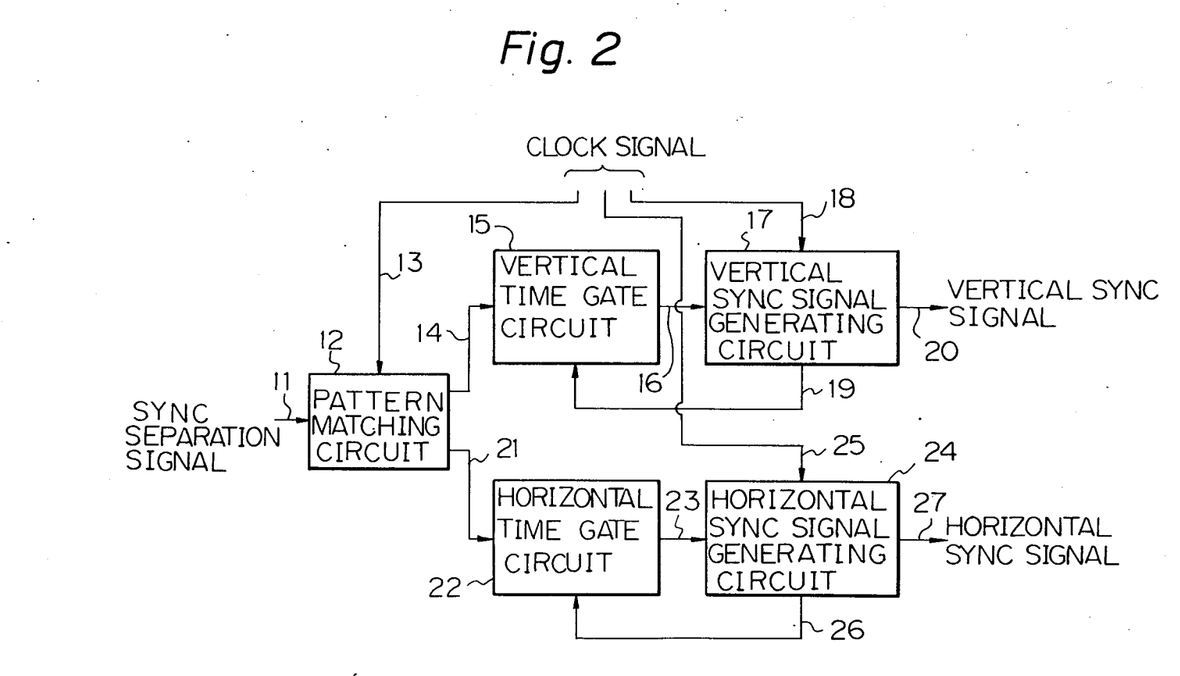
FIG. 2 is a block circuit diagram and embodiment of a synchronization signal generating circuit according to the present invention.

FIG. 2 is a general block circuit diagram of an embodiment of a synchronization signal generating circuit according to the present invention, e.g. for use in the liquid crystal display panel television receiver of FIG. 1. A sync separation signal, denoted by numeral 11, is input to a pattern matching circuit 12, which acts to recognize horizontal sync pulse components and vertical sync pulse components of the sync separation signal, and produce a pulse (referred to in the following as a horizontal pattern detection pulse) in synchronism with each horizontal sync pulse component as described hereinafter, and to produce a pulse (referred to in the following as a vertical pattern detection pulse) in synchronism with each vertical sync pulse component. The vertical pattern detection pulses, denoted by numeral 14, are input to a vertical time gate circuit 15. The vertical time gate circuit 15 operates such that when an open state of that gate circuit has been implemented (by a clear pulse produced as described hereinafter), then the next vertical pattern detection pulse to be output from pattern matching circuit 12 will result in a reset pulse 16 being output from vertical time gate circuit 15, whereupon vertical time gate circuit 15 becomes closed to inhibit further response to pulses input thereto. The reset pulse thus output by vertical time gate circuit 15 is input to a vertical sync signal generating circuit 17. Clock signal pulses of relatively high frequency are applied, as indicated by numeral 18, to a counter circuit which is incorporated in vertical sync signal generating circuit 17. The input of a clear pulse 16 to vertical sync signal generating circuit 17 causes reset of this counter circuit, which thereupon begins to count the clock signal pulses 18 which are input thereto. When a predetermined count value is reached, a vertical sync signal pulse is produced by vertical sync signal generating circuit 17, e.g. by synthesizing such a pulse from output signals produced by the counter circuit therein. The vertical sync signal pulses thus output are indicated by numeral 20. As stated above, vertical time gate circuit 15 is set in the closed state after output of a reset pulse 16 therefrom. This closed condition is continued until a time shortly prior to the point at which the next vertical pattern detection pulse should be output from pattern matching circuit 12 (i.e. the closed state is continued for a time interval slightly less than the vertical sync period, typically approximately 99% of that period), whereupon a clear pulse denoted by numeral 19 is output from vertical sync signal generating circuit 17 which acts to open vertical time gate circuit 15. If a vertical pattern detection pulse is now output from pattern matching circuit 12 at the appropriate timing, this will be transferred through vertical time gate circuit 15 and the process of events described above will be repeated, to produce the next vertical sync signal pulse from vertical sync signal generating circuit 17. However if no vertical pattern detection pulse should be produced at the latter timing, e.g. as a result of signal drop-out, then self-reset of the counter circuit in vertical sync signal generating circuit 17 will be performed automatically. Counting by the counter circuit in vertical sync signal generating circuit 17 will then begin, whereby a vertical sync signal pulse will be output after a time interval equal to the vertical sync period.

When this occurs, vertical time gate circuit 15 will be left in the open state, which will continue until the next output of a vertical pattern detection pulse from pattern matching circuit 12. In this way, if the output of vertical pattern detection pulses should be interrupted for one or for several successive vertical scanning intervals, vertical sync signal pulses will continue to be output at accurate timings from vertical sync signal generating circuit 17, since the period between the time points at which self-reset of the counter circuit in vertical sync signal generating circuit 17 is performed is preset to be equal to the vertical scanning interval (e.g. approximately 262.5H).

It can thus be understood that during normal operation, vertical time gate circuit 15 will only remain in the open state during very short time intervals each of which extend from a point shortly prior to the timing of a vertical pattern detection pulse until the point of generation of that vertical pattern detection pulse, and is held closed at all other times. Thus, a high degree of noise rejection is attained. If drop-out of the vertical sync signal component of the video signal should occur, then synchronization recovery can be rapidly accomplished, since vertical time gate circuit 15 will be left in the open state when such drop-out occurs, ready to respond to the next vertical pattern detection pulse input thereto, to apply a corresponding reset pulse to vertical sync signal generating circuit 17 after recovery from the drop-out condition occurs.

Numeral 22 denotes a horizontal time gate circuit which receives horizontal pattern detection pulses 21 from pattern matching circuit 12, and applies corresponding reset pulses, as output 23, to horizontal sync signal generating circuit 24. Clear pulses 26 from horizontal sync signal generating circuit 24 act to control the operation of horizontal time gate circuit 22 in exactly the same manner as clear pulses 19 from vertical sync signal generating circuit 17 control vertical time gate circuit 15, as described hereinabove. The horizontal sync signal generating circuit 24 includes a counter circuit which counts pulses of a clock signal 25, and the combination of horizontal time gate circuit 22 and horizontal sync signal generating circuit 24 act to produce horizontal sync signal pulses in response to these clock signal pulses and to the horizontal pattern detection pulses in an identical manner (although with different timing relationships) to that described for vertical time gate circuit 15 and vertical sync signal generating circuit 17 hereinabove.

Figures 3A, 3B:
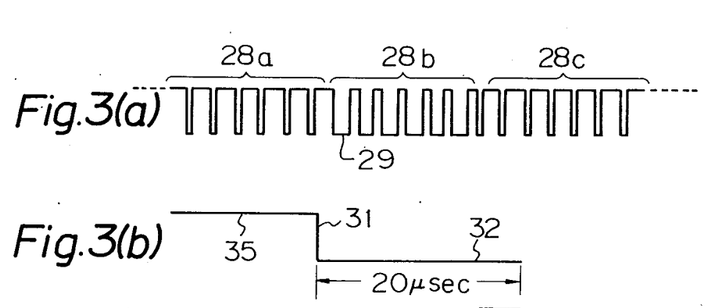

The operation of pattern matching circuit 12 will now be described with reference to the timing charts of FIG. 3(a) to 3(e). FIG. 3(a) shows a vertical sync pulse component of the sync separation signal which is input to pattern matching circuit 12 in FIG. 2. This comprises a set of short-duration negative-going pulses 28a, followed by a set of long-duration negative-going pulses 28b, then a second set of short-duration negative-going pulses 28c. The vertical sync signal generating circuit 17 acts to recognize such a vertical sync pulse component by detecting one of the long-duration negative-going pulses 28b, e.g. the first such pulse, denoted as 29. The process of recognition, and subsequent generation of a vertical pattern detection pulse, is illustrated in FIG. 3(a)b and (c). In FIG. 3(b), numeral 31 denotes the falling edge of negative-going pulse 29 in FIG. 3(a), which moves between a high level potential 35 and a low level potential 32. If the sync separation signal remains at the low level for at least approximately 17 $\mu$s after a falling edge 31, then this is recognized as a vertical sync pulse component, and a vertical pattern detection pulse is then initiated by pattern matching circuit 12, as indicated by rising edge 34 in FIG. 3(c). The duration of each of the long-duration negative-going pulses in the vertical sync signal component is approximately 20 $\mu$s, so that a time discrimination value of 17 $\mu$s is suitable for distinguishing such negative-going pulses from the horizontal sync pulse components and the short-duration negative-going pulse components (28a, 28c) in the sync separation signal.

Figures 3C, 3D:
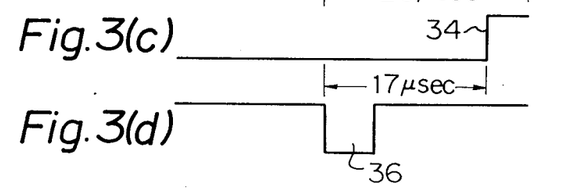
Figure 3E:
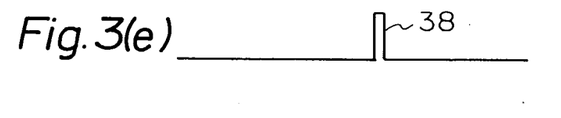

The process of discriminating horizontal sync pulse components is illustrated by FIGS. 3(d) and 3(e). Numeral 36 denotes a negative-going pulse component of the sync separation signal. If the width of this pulse is in the range 3.5 $\mu$s to 10 $\mu$s, then this will be recognized as being a horizontal sync pulse component, and a short-duration horizontal pattern detection pulse will then be output by pattern matching circuit 12, as indicated by numeral 38.

It can thus be understood that the conditions set for recognition of a vertical sync pulse component of the sync separation signal, for generating a vertical pattern detection pulse from pattern matching circuit 12, are that the pulse component shall be negative-going, of duration at least 17 $\mu$s. The conditions for recognition of a horizontal sync pulse component of the sync separation signal, for generating a horizontal pattern detection pulse from pattern matching circuit 12, are that the pulse component shall be negative-going, of duration within the range 3.5 $\mu$s to 10 $\mu$s.

Figure 4:
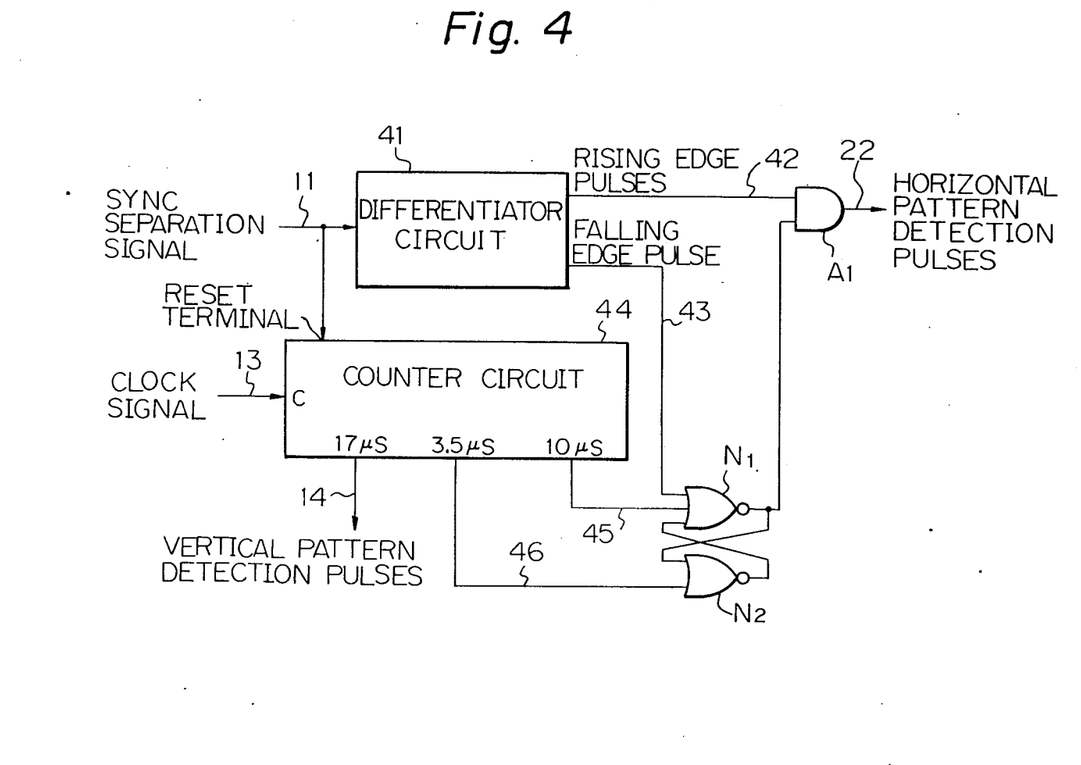
FIG. 4 is a circuit diagram of an embodiment of a pattern matching circuit shown in the embodiment of FIG. 2, for producing horizontal pattern detection pulses and vertical pattern detection pulses.

FIG. 4 is a block circuit diagram of an example of a portion of pattern matching circuit 12, which performs recognition of the vertical sync pulse components and horizontal sync pulse components of the sync separation signal as described above. This comprises a differentiator circuit 41, a counter circuit 44, a latch circuit made up of NOR gates N1, N2, and an AND gate A1. The sync separation signal is input to differentiator circuit 41 and to a reset input terminal of counter circuit 44. A clock signal comprising a high-frequency pulse train is applied to a clock input terminal of counter circuit 44. Vertical pattern detection pulses are output from a "17 $\mu$s" terminal of counter circuit 44, i.e. a terminal which produces a pulse output when the reset condition of counter circuit 44 has been released for longer than 17 $\mu$s (i.e. when the sync signal has remained at the low level potential for longer than approximately 17 $\mu$s.

One input of AND gate A1 is connected to an output terminal of differentiator circuit 44 from which rising edge pulses are produced, i.e. pulses which are respectively generated on the rising edges of the sync separation signal. Conversely, falling edge pulses, generated on each falling edge of sync separation signal 11, are input to one input of NOR gate N1. A "3.5 μs" output terminal of counter circuit 44 is coupled to one input of NOR gate N2, to input a (positive-going) pulse thereto after the sync separation signal has remained at the low level for longer than approximately 3.5 μs, while a "10 μs" output terminal of counter circuit 44 is coupled to an input of NOR gate N1, to input a pulse thereto when the sync separation signal has remained at the low level for longer than approximately 10 μs.

Each time the sync separation signal falls to the low level potential, the reset state of counter circuit 44 is released, and counting thereby is initiated. If the reset state continues for more than 17 μs, then a vertical pattern detection pulse 14 will be output from the "17 μs" terminal. If the reset condition continues for a period of more than 3.5 μs and less than 10 μs, then it will be apparent that a horizontal pattern detection pulse will be output from AND gate A1. Thus, the circuit of FIG. 4 generates horizontal pattern detection pulses and vertical pattern detection pulses in accordance with the recognition conditions described hereinabove.

Figure 5:
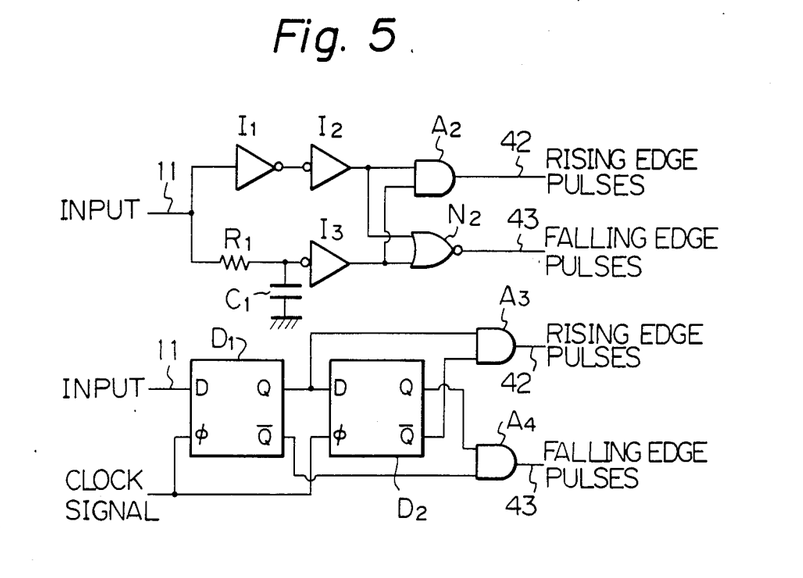
FIG. 5 shows circuit diagrams of embodiments of differentiator circuits for use in the embodiment of FIG. 2.

Referring now to FIG. 5(a) and (b), examples of differentiator circuits for use as differentiator circuit 41 in the circuit of FIG. 4 are shown. The differentiator circuit example of FIG. 5(a) is made up of a pair of series-connected inverters I1 and I2, with the input of inverter I1 coupled to receive the sync separation signal 11 and the output of inverter I2 being applied to one input of an AND gate A2 and one input of a NOR gate N2. The circuit further comprises a delay circuit made up of a resistor R1 and a capacitor C1 connected in series between the sync separation signal input and ground potential as shown, with the junction of these being connected to the input of an inverter I3, whose output is applied to the other inputs of each of AND gate A2 and NOR gate N2. It will be apparent that a positive-going pulse, of duration substantially equal to the time constant provided by resistor R1 and capacitor C1 will be produced, as rising edge pulse 42, from AND gate A2 each time a rising edge of the sync separation signal occurs. Similarly, a pulse of identical duration will be produced from NOR gate N2 each time a falling edge of the sync separation signal occurs.

The differentiator circuit example of FIG. 5(b) differs from that of FIG. 5(a) in that only digital circuit elements are employed, i.e. two data-type flip-flops D1 and D2 an two AND gates A3 and A4. A clock signal is applied to the clock input terminals of each of flip-flops D1 and D2. It will be apparent that each time the input sync separation signal changes from the high to the low logic level, a pulse will be output from AND gate A4, due to the fact that a delay of one clock pulse period will elapse between the changes in level of the Q output of D1 and the Q output of D2 which result from the change in level of the sync separation signal. In this way, falling edge pulses are output from AND gate A4. In a similar way, rising edge pulses will be output from AND gate A3.

Figure 6:
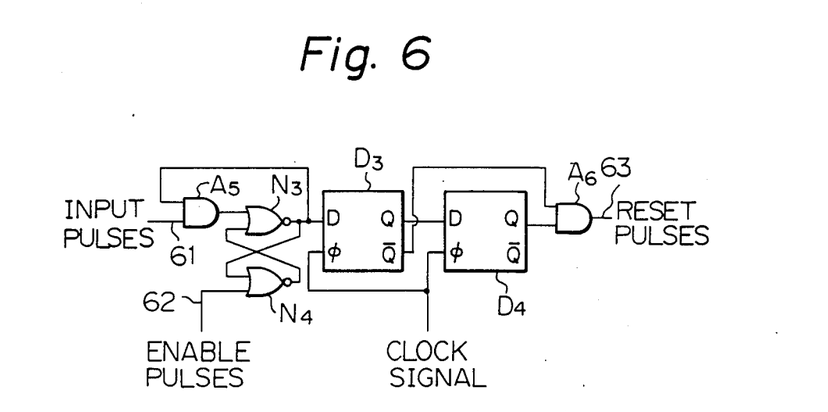
FIG. 6 is a circuit diagram of an example of a circuit for use as a horizontal time gate circuit or vertical time gate circuit in the embodiment of FIG. 2.

FIG. 6 shows an example of a circuit arrangement which is suitable for each of vertical time gate circuit 15 and horizontal time gate circuit 22 in the embodiment of FIG. 2 above. This comprises an AND gate A5 with one input coupled to receive the input pulses (i.e. vertical pattern detection pulses or horizontal pattern detection pulses) from pattern matching circuit 12, a latch circuit made up of cross-connected NOR gates N3 and N4, two data-type flip-flops D3 and D4 and a AND gate A6. The output of AND gate A5 is applied to one input of NOR gate N3, while the output of NOR gate N3 is coupled to the other input of AND gate A5, and to the data input terminal of data-type flip-flop D3. The clear pulses (i.e clear pulses 19 or 26 shown in FIG. 2) are applied to an input of NOR gate N4. The Q output of data-type flip-flop D3 is applied to the data input terminal of data-type flip-flop D4, while the Q̄ output of data-type flip-flop D3 is applied to one input of AND gate A6, and the Q output of data-type flip-flop D4 is applied to the other input of AND gate A6. Clock signal pulses are applied to the clock input terminals of data-type flip-flop D3 and D4. The operation of this circuit is as follows. Assuming that the gate is in the open condition, i.e. with the latch circuit made up of N3 and N4 being set with the output from N3 at the high logic level, then input of a pulse 61 to AND gate A5 will result in an output pulse from that gate, which will trigger the latch circuit to the opposite state, with the output of N3 going to the low level. AND gate A5 is now inhibited, i.e. the time gate circuit is now closed. A pulse will thereby be produced from AND gate A6, in response to the falling edge of the output signal from N3, as has been described hereinabove for the case of generation of falling edge pulses from the oircuit of FIG. 5(b). This output pulse from AND gate A6 acts to reset the counter circuit within the sync signal generating circuit (vertical or horizontal) to which the time gate circuit is connected, whereby a sync signal pulse will be produced as has been described previously.

Subsequently, when a clear pulse is output from the corresponding sync signal generating circuit, and input to NOR gate N4, the latch circuit will be reset to its original state with the output from NOR gate N4 at the high level, so that AND gate A5 is once more enabled, i.e. the time gate circuit is once more open.

Figure 7:
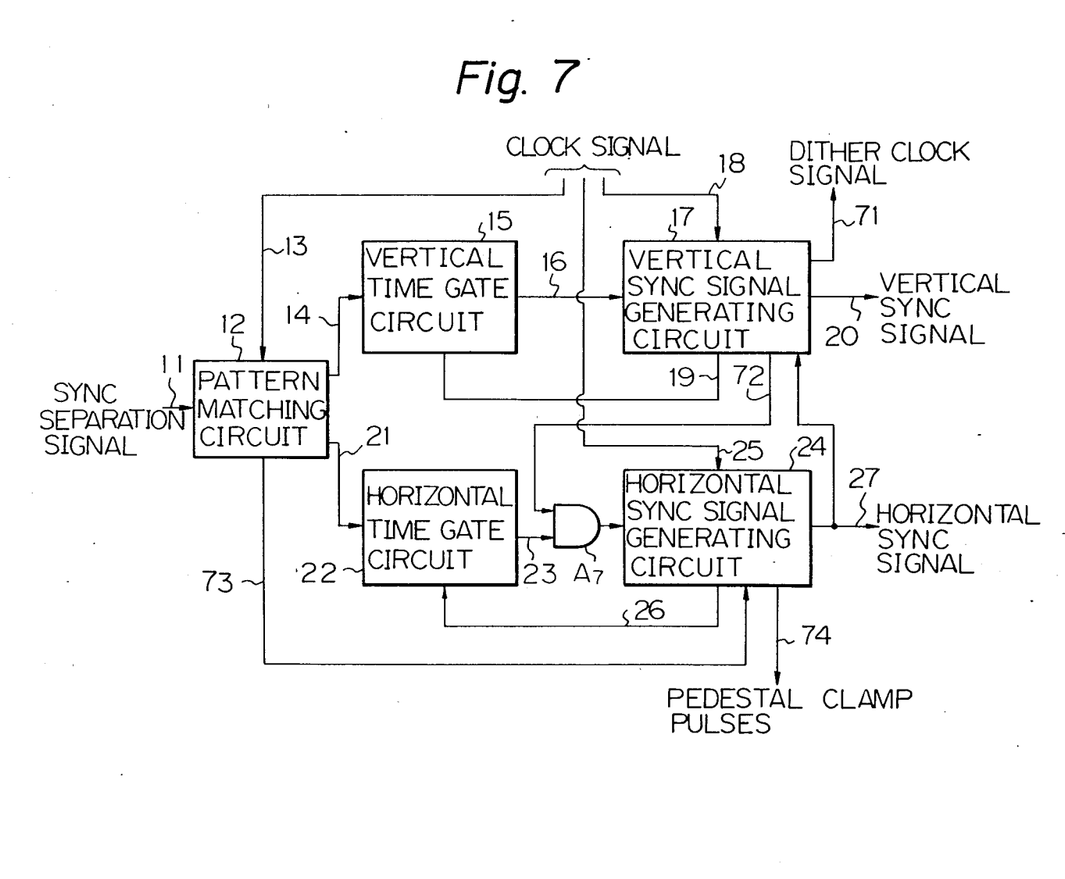
FIG. 7 is a circuit diagram of a second embodiment of a synchronization signal generating circuit according to the present invention.
Figures 8A, 8K:
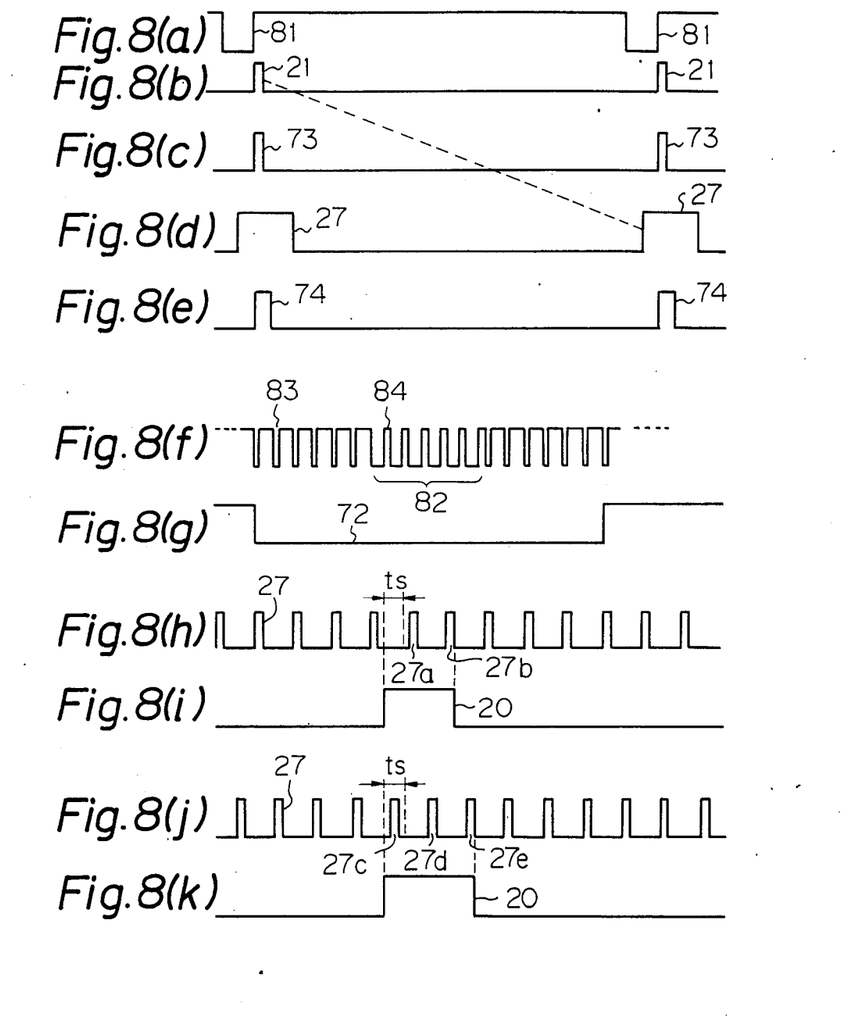

Another embodiment of a synchronization signal generating circuit according to the present invention will now be described, with reference to the block circuit diagram of FIG. 7, and the timing charts of FIG. 8(a) to 8(k). In FIG. 7, the operation and functions of pattern matching circuit 12, vertical time gate circuit 15, vertical sync signal generating circuit 17, horizontal time gate circuit 22 and horizontal sync signal generating circuit 24, with respect to the generation of vertical sync signal pulses and horizontal sync signal pulses, are essentially identical to those of the embodiment of FIG. 2 described hereinabove. However an AND gate A7 is added, which selectively transfers the reset pulses 23 from horizontal time gate circuit 22 to horizontal sync signal generating circuit 24 under the control of a blocking signal 72 which is generated by vertical sync signal generating circuit 17 in this embodiment. In addition, vertical sync signal generating circuit 17 receives the horizontal sync signal pulses 27, for use in generating a dither clock signal 71. Furthermore, the rising edge pulses which are generated in pattern matching circuit 12 as described above, are input to horizontal sync signal generating circuit 24 for use in producing pedestal clamp pulses 74. In FIG. 8, (a) shows the horizontal sync pulse components 81 of the sync separation signal. As shown in FIG. 8(a), (b) and (c), a rising edge pulse 73 is produced by pattern matching circuit 12 at the end of each of these horizontal sync pulse components, and (if that pulse meets the recognition conditions described hereinabove, set by pattern matching circuit 12), a corresponding horizontal pattern detection pulse 21 is thereby generated. This horizontal pattern detection pulse 21 results in output of a reset pulse 23 from horizontal time gate circuit 22, (which at that time will be have been set in the open state by a preceding clear pulse 26),to reset the counter circuit within horizontal sync signal generating circuit 24, which begins counting pulses of clock signal 25. When a predetermined count value is reached, after a time has elapsed since the start of the preceding horizontal sync signal pulse 27 which is precisely equal to the horizontal sync period H, then a horizontal sync signal pulse 27 is output by horizontal sync signal generating circuit 24. Thus, in FIG. 8, the first, i.e. leftmost sync component pulse 81 will result in the generation of the second (i.e. rightmost) horizontal sync signal pulse 27, as is indicated by the broken line which connects these pulses in FIG. 8(b) to 8(d). If a horizontal pattern detection pulse 21 is absent at the requisite time, then self-reset of the counter circuit in horizontal sync signal generating circuit 24 is peformed as described hereinabove, and counting by that counter circuit begins, so that the next horizontal sync signal pulse 27 will be output at the correct timing.

A pedestal clamp pulse 74 is gnerated by horizontal sync signal generating circuit 24 in response to each rising edge pulse 73 which is input thereto, as indicated in FIG. 8(e), for use as described hereinafter.

The process of generating vertical sync signal pulses by this embodiment is illustrated in FIG. 8(f) to (k). Here, FIG. 8(f) shows a vertical sync pulse component, comprising the sets of short and long-duration negative-going pulses described hereinabove. FIG. 8(g) shows a blocking pulse 72 which is applied to AND gate A7 in FIG. 7. This pulse extends from the start to the end of the short-duration negative going pulses in the vertical sync pulse component, denoted by 83, and serves to prevent erroneous resetting of the counter circuit within horizontal sync signal generating circuit 24 due to these short-duration pulses (possibly in combination with noise spikes) causing erroneous output of reset pulses 21 from pattern matching circuit 12. This is important, since horizontal time gate circuit 22 will be left in the open state for the duration of each vertical sync pulse component group.

FIG. 8(h) shows the train of horizontal sync signal pulses 27 which are output from horizontal sync signal generating circuit 24 during one vertical field interval, and FIG. 8(j) shows the horizontal sync signal pulses which are output during the next field interval, for the case of a composite video signal which is to produce interlace scanning. FIG. 8(i) shows a vertical sync signal pulse which is produced during the first of these field intervals, and FIG. 8(k)1 shows the vertical sync signal pulse for the next field interval. In order to clarify the timing relationships between signals in FIG. 8(f) to (k), these have all been drawn with identical time axis scale values. In the embodiment of FIG. 7, vertical sync signal generating circuit 17 includes a second counter circuit, which begins to count horizontal sync signal pulses 27 after a predetermined time delay (indicated as $t_s$ in FIG. 8) from the start of each vertical sync signal pulse 20. When the second of these horizontal sync signal pulses 27 has been counted, then that vertical sync signal pulse 20 is terminated, at a timing synchronized with the falling edge of that second horizontal sync signal pulse. With such an interlace composite video signal, the timing of the leading edge of a vertical sync signal pulse generated during the first field interval, as shown in FIG. 8(i), will closely follow the output of a horizontal sync signal pulse 27, while the leading edge of a vertical sync signal pulse during the next field interval, as shown in FIG. 8(k), will be substantially delayed from the preceding horizontal sync signal pulse 27. Thus, by suitably arranging the value of delay time $t_s$, only two horizontal sync signal pulses 27 (denoted as 27a, 27b in FIG. 8(h), and as 27d, 27e in FIG. 8(j)) will be counted in every vertical scanning interval by the second counter circuit within vertical sync signal generating circuit 17 described above, so that the falling edge of the vertical sync signal pulse produced during alternate vertical scanning field of an interlace scanning signal will occur at identical timings, with respect to the set of horizontal sync signal pulses 27 which are output for each of these scanning field. As a result, such a synchronization signal generating circuit can be utilized, with no modification whatsoever, for both interlace and non-interlace scanning applications. In the case of a non-interlace scanning composite video signal being processed, then only the timing relationships shown in FIG. 8(h) and 8(i) will apply.

Figure 9:
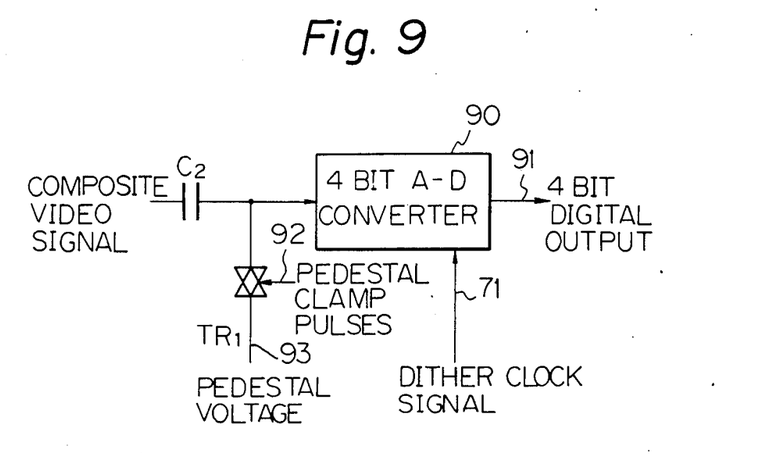
FIG. 9 is a circuit diagram of an A-D conversion circuit which is driven by output signals from the embodiment of the present invention shown in FIG. 7.

FIG. 9 shows a circuit for converting the brightness component of a composite video signal into digital signal form, in which signals produced by the embodiment of the present invention shown in FIG. 7 are utilized, i.e. which receives the dither clock signal 71 and the pedestal clamp pulses 74 as inputs. This circuit can be formed on the same IC chip as the circuit of FIG. 7. In FIG. 9, numeral 90 denotes a CMOS A-D converter which converts the brightness signal component of the composite video signal into 4-bit digital form. Numeral 91 denotes the 4-bit output signal from CMOS A-D converter. Numeral 92 denotes an input terminal which receives the pedestal clamp pulses, numeral 93 denotes an input terminal which is coupled to a pedestal voltage generating circuit which is formed on the same IC chip as this circuit, numeral 94 denotes a dither clock signal input terminal, and C2 denotes a capacitor for blocking the DC component of the composite video signal. TR1 is a transmission gate which biases the gate of CMOS A-D converter 90 and capacitor C2 by the pedestal voltage 93 when pedestal clamp pulse 74 is at the high level. In this example, each time the dither clock signal 71 is inverted in level, the comparison voltage level of CMOS A-D converter 90 is slightly altered. This has the effect of reducing the level of quantization noise is reduced. In addition, since each pedestal clamp pulse 74 is positioned on the "back porch" portion of the composite video signal, the "back porch" voltage of the composite video signal which is input to the gate of CMOS A-D converter 90 is held constant.

Figure 10:
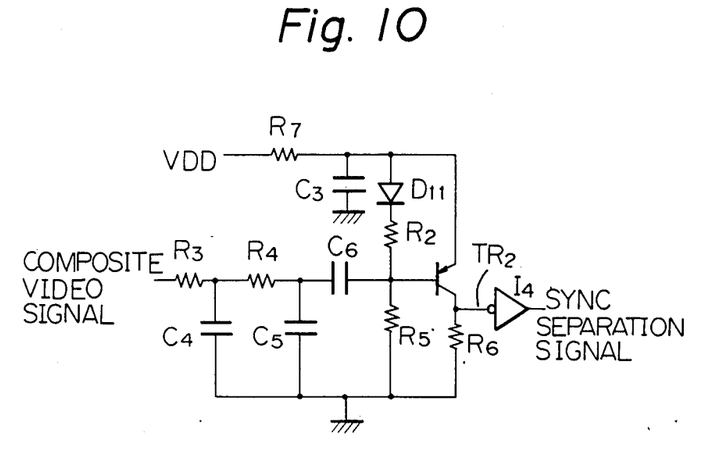
FIG. 10 is a circuit diagram of a sync separation circuit which is suitable for use with a synchronization signal generating circuit according to the present invention.

FIG. 10 shows an example of a suitable circuit for sync separation circuit 2 shown in the embodiment of FIG. 7, for producing sync separation signal 11. R2 to R7 denote resistors, C3 to C6 denote capacitors, D1 denotes a diode which is used for temperature characteristic compensation and TR2 is a transistor for selectively amplifying the sync signal component of the composite video signal. I4 is a CMOS inverter for performing waveform shaping and inversion of the output signal from TR2. Inverter I4 can be conveniently formed as a CMOS element, on the same IC chip as the circuit embodiment of FIG. 7. R7 and C3 constitute a filter for removal of power supply noise present in the power supply voltage $V_{DD}$. R3, R4, C4 and C5 form a high-frequency cut-off filter. C6 is a capacitor for blocking the DC component of the composite video signal, while D1, R2 and R5 perform biasing of TR2.

Typical circuit component values for the sync separation circuit of FIG. 10, for use with the embodiment of FIG. 7, are as follows. R2 is 100 KΩ, R3 is 470Ω, R4 is 470Ω, R5 is 390 KΩ, R6 is 33 KΩ, R7 is 100Ω, C3 is 10 μF, C4 is 200 pF, C6 is 1 μF. Power supply voltage $V_{DD}$ is 4V, with ground potential being 0 V. $V_{11}$ is a silicon diode, TR2 is a silicon transistor.

The circuit example shown in FIG. 7 can be formed on the same IC chip as clock signal generating circuit 4 which is shown in FIG. 1, and it is not necessary to generate separate control clock signals for driving the liquid crystal display panel drive circuit shown in FIG. 1. Apart from the vertical sync signal 20 and horizontal sync signal 27, only the dither clock signal 71 and pedestal clamp pulses 74 are output from the circuit embodiment of FIG. 7. However it should be noted that it is possible to utilize the counter circuits incorporated in vertical sync signal generating circuit 17 and horizontal sync signal generating circuit 24, (used as described above to generate the horizontal and vertical sync signal pulses)it to generate special signals for driving the liquid crystal display, such as time-overlapping signals used with a pulse width modulation drive method, a clock signal which defines the screen display period in the horizontal direction, and a clock signal which defines the screen display period in the vertical direction. It will be apparent that such signals can be readily generated with a fixed timing correspondence to the vertical and horizontal sync signal pulses which are output by the synchronization signal generating circuit.

It will thus be clear from the above that a synchronization signal generating circuit according to the present invention enables recognition of vertical and horizontal sync pulse components of a sync separation signal derived from a composite video signal to be accurately performed and enables vertical sync signal pulses and horizontal sync signal pulses to be generated at precisely determined timings, even in the presence of noise in the input signal or in the event of temporary drop-out of the sync signal components therein. In addition a synchronization signal generating circuit according to the present invention performs only digital signal processing, using digital counter and gate elements, and so can be implemented almost entirely within a single IC chip, such as a CMOS IC, which can also serve to produce the clock signals which control drive operations for a display device (e.g. liquid crystal display panel) to which the horizontal and vertical sync signal pulses produced by the synchronization signal generating circuit are applied.

Although the above embodiments have been described for the case of a synchronization signal generating circuit which drives a liquid crystal display panel of a television receiver, it should be noted that a synchronization signal generating circuit according to the present invention is equally applicable to a CRT display, offering the advantages of excellent noise rejection etc. described hereinabove. In addition, the invention is also applicable to generation of sync signals for other display applications than television, e.g. for computer displays, etc.

Thus, although the present invention has been described in the above with reference to specific embodiments, it should be noted that various changes and modifications to the embodiments may be envisaged, which fall within the scope claimed for the invention as set out in the appended claims. The above specification should therefore be interpreted in a descriptive and not in a limiting sense.

What is claimed is:

1. A synchronization signal generating circuit for producing horizontal sync signal pulses and vertical sync signal pulses from a sync separation signal which is derived from a composite video signal, comprising:

pattern matching circuit means for performing recognition of vertical sync pulse components in said sync separation signal to generate a vertical pattern detection pulse in synchronism with each of said vertical sync pulse components and for performing recognition of horizontal sync pulse components in said sync separation signal to generate a horizontal pattern detection pulse in synchronism with each of said horizontal sync pulse components;

vertical time gate circuit means coupled to receive said vertical pattern detection pulses from said pattern matching circuit means, operable to be set in an open state in which reset pulses are output therefrom in response to successive ones of said vertical pattern detection pulses and to immediately enter a closed state following output of each of said reset pulses, in which the output of the reset pulses therefrom is inhibited;

vertical sync signal generating circuit means comprising first counter circuit means for counting pulses of a first clock signal, said first counter circuit means being reset to a predetermined initial state by each of said reset pulses, said verticaly sync signal generating circuit means acting to synthesize a vertical sync signal pulse in response to the resetting of said counter circuit means by each of said reset pulses and further acting to reset said counter circuit means to said initial count state and to synthesize one of said vertical sync signal pulses when a first predetermined time interval corresponding to a predetermined count value of said counter circuit means has elapsed following generation of one of said reset pulses, said vertical sync signal generating circuit means further acting to set said vertical time gate circuit means in said open state thereof, following input of a reset signal to said vertical sync signal generating circuit means, after a second time interval has elapsed following generation of one of said reset pulses, where said second time interval is shorter than said first predetermined time interval;

horizontal time gate circuit means coupled to receive said horizontal pattern detection pulses from said pattern matching circuit means, operable to be set in an open state in which reset pulses are output therefrom in response to successive ones of said horizontal pattern detection pulses and to immediately enter a closed state following output of each of said reset pulses therefrom, in which the output of the reset pulses therefrom is inhibited, and;

horizontal sync signal generating circuit means comprising second counter circuit means for counting pulses of a second clock signal, said second counter circuit means being reset to a predetermined initial state by each of said reset pulses from said horizontal time gate circuit means, said horizontal sync signal generating circuit means acting to synthesize a horizontal sync signal pulse in response to resetting of said second counter circuit means by each of said reset pulses and further acting to reset said second counter circuit means to said initial count state and to synthesize one of said horizontal sync signal pulses when a third predetermined time interval corresponding to a predetermined count value of said second counter circuit means has elapsed following generation of one of said reset pulses from said horizontal time gate circuit means, said horizontal sync signal generating circuit means further acting to set said horizontal time gate circuit means in said open state thereof, following input of a reset signal to said horizontal sync signal generating circuit means, after a fourth time interval has elapsed following generation of one of said reset pulses from said horizontal time gate circuit means, where said fourth time interval is shorter than said third predetermined time interval;

said pattern matching means comprising third counter circuit means coupled to count pulses of a third clock signal and controlled by said sync separation signal such as to be enabled to count said third clock signal pulses only while said sync separation signal remains at a first predetermined potential level and to be otherwise held in a reset condition, said third counter circuit means producing a pulse constituting one of said vertical pattern detection pulses after said sync separation signal has remained at said first predetermined potential level for a fifth predetermined time interval, corresponding to a specific count value of said third counter circuit means, and further comprising circuit means coupled to receive count output signals from said third counter circuit means and comprising a differentiator circuit coupled to receive said sync separation signal, having a first output terminal for producing an output pulse each time a transition of said sync separation signal from a second predetermined potential level to said first potential level occurs and a second output terminal for producing an output pulse each time a transition of said sync separation signal from said first potential level to said second potential level occurs, a logic gate having an input terminal coupled to said differentiator circuit first output terminal, and a latch circuit for controlling said logic gate circuit, said latch circuit being controlled by said pulses from said differentiator circuit second output terminal and by said count output signals from said third counter circuit means such as to be set in a state inhibiting transfer of said pulses from said differentiator circuit first output terminal through said logic gate, in response to each of said output pulses from said differentiator circuit second output terminal and also in response to said third counter circuit means attaining said second count value, and being set in a state enabling transfer therethrough of said pulses from said differentiator circuit first output terminal in response to said third counter circuit means attaining said first count value, for thereby producing an output pulse constituting one of said horizontal pattern detection pulses each time said sync separation signal remains at said predetermined potential level for more than a sixth predetermined time duration and less than a seventh predetermined time interval, said sixth and seventh predetermined time intervals respectively corresponding to attainment of first and second count values by said third counter circuit means.

* * * * *